United States Patent
Kurokochi

(10) Patent No.: US 7,605,555 B2
(45) Date of Patent: Oct. 20, 2009

(54) STABILIZER CONTROL DEVICE FOR CONTROLLING ROLL RIGIDITY OF A STABILIZER

(75) Inventor: Takashi Kurokochi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 11/704,304

(22) Filed: Feb. 9, 2007

(65) Prior Publication Data

US 2007/0194733 A1 Aug. 23, 2007

(30) Foreign Application Priority Data

Feb. 21, 2006 (JP) .............................. 2006-044060

(51) Int. Cl.
*H02P 3/14* (2006.01)

(52) U.S. Cl. ........................ 318/376; 318/139; 318/375; 318/377

(58) Field of Classification Search ................. 318/139, 318/375, 376, 377, 153, 362; 280/5.506
See application file for complete search history.

(56) References Cited

U.S. PATENT DOCUMENTS

| | | | | |
|---|---|---|---|---|
| 5,027,048 A * | 6/1991 | Masrur et al. | ................ | 318/806 |
| 5,036,934 A * | 8/1991 | Nishina et al. | ............... | 180/165 |
| 5,070,284 A * | 12/1991 | Patil et al. | ................... | 318/362 |
| 5,091,679 A * | 2/1992 | Murty et al. | ................. | 318/153 |
| 5,644,202 A * | 7/1997 | Toriyama et al. | ............ | 318/369 |
| 6,111,375 A * | 8/2000 | Zenobi | ....................... | 318/376 |
| 6,222,334 B1 * | 4/2001 | Tamagawa et al. | .......... | 318/376 |
| 6,385,522 B1 * | 5/2002 | Pugh | ............................ | 701/70 |
| 2005/0179220 A1 * | 8/2005 | Yasui et al. | .............. | 280/5.506 |

FOREIGN PATENT DOCUMENTS

| | | |
|---|---|---|
| CN | 1672967 A | 9/2005 |
| DE | 199 44 244 A1 | 3/2000 |
| DE | 102 57 211 A1 | 6/2004 |
| JP | A 2005-35515 | 2/2005 |
| JP | A 2005-225301 | 8/2005 |

* cited by examiner

*Primary Examiner*—Bentsu Ro
*Assistant Examiner*—David S Luo
(74) *Attorney, Agent, or Firm*—Oliff & Berridge, PLC

(57) ABSTRACT

A stabilizer control device includes: an electric motor having a regenerative function; a stabilizer, connecting a left wheel and a right wheel, that is capable of altering a roll rigidity via the electric motor; vehicle behavior detection device that detects a vehicle behavior; regenerative current setting device that sets a regenerative current of the electric motor based on the vehicle behavior detected by the vehicle behavior detection device; and regenerative current adjusting device that adjusts the regenerative current of the electric motor so that the regenerative current set by the regenerative current setting device is reached. The spring reaction force against the twist of the stabilizer rotates the electric motor to thereby generate electricity. Vehicle behavior such as body roll is detected and the regenerative current of the electric motor is set based on the detected vehicle behavior to restrain or accelerate the twist or return of the stabilizer.

14 Claims, 8 Drawing Sheets

STABILIZER CONTROL DEVICE FOR CONTROLLING ROLL RIGIDITY OF A STABILIZER

INCORPORATION BY REFERENCE

This disclosure of Japanese Patent Application No. 2006-044060, filed on Feb. 21, 2006, including the specification, drawings, and abstract, is incorporated by reference in its entirety.

BACKGROUND OF THE INVENTION

1. Field of the Invention

The invention relates to a stabilizer control device that controls the roll rigidity of a stabilizer by an electric motor.

2. Description of the Related Art

When a vehicle turns, the centrifugal force causes roll, which degrades stability. Therefore, vehicles are provided with stabilizers. A stabilizer comprises a stabilizer bar, the central portion of which is fixed to a vehicle body, and the two opposite end portions of which are linked to a suspension. When the vehicle rolls during a turn, the suspension is compressed on the outer wheels and extended on the inner wheels, thus twisting the stabilizer bar. When this occurs, the stabilizer acts as a spring, and a spring reaction force against the twist occurs. Due to this spring reaction force, the stabilizer bar is returned from the twisted state, and the outer wheel side is raised, and the roll is restrained.

In recent years, active stabilizers that actively control the twist and/or return of the stabilizer bar by using electric motors have been developed (see Japanese Patent Application Publication No. JP-A-2005-225301). The active stabilizer comprises stabilizer bars on the left and right sides, and an actuator that is provided between the stabilizer bars. Furthermore, in the active stabilizer, a target control amount is set on the basis of the lateral acceleration representing the roll state of the vehicle, and the like. On the basis of the target control amount, an electric motor of the actuator is driven to perform a twisting control on the stabilizer bars (a control to twist the stabilizer bars from the neutral position), and a return control thereon (a control that returns the stabilizer bars to the neutral position).

However, when an electric motor is used to perform the control, there are restrictions of the electric motor in rotation speed and the like according to the specifications of the electric motor. Therefore, if the vehicle behavior sharply changes so that the target control amount exceeds a limit of the electric motor, the actual rotation of the electric motor fails to follow the target. In addition, if lateral acceleration occurs due to the turning of the vehicle, a command to achieve a target control amount based on the lateral acceleration is output to the electric motor; however, there is a delay before the electric motor can achieve the target control amount in response to the command. Thus, there are cases where the electric motor cannot sufficiently follow a change in vehicle behavior depending on the response performance of the electric motor. Therefore, appropriate roll control may lag the vehicle behavior, causing discomfort to occupants of the vehicle.

SUMMARY OF THE INVENTION

Accordingly, the invention provides a stabilizer control device that controls the stabilizer with high response.

A stabilizer control device in accordance with a first aspect of the invention is includes the following components: an electric motor having a regenerative function; a stabilizer connecting a left wheel and a right wheel that is capable of altering a roll rigidity via the electric motor; vehicle behavior detection device that detects a vehicle behavior; regenerative current setting device that sets a regenerative current of the electric motor based on the vehicle behavior detected by the vehicle behavior detection device; and regenerative current adjusting device that adjusts the regenerative current of the electric motor so that the regenerative current set by the regenerative current setting device is reached.

In the stabilizer control device, the electric motor has the regenerative function. That is, due to the spring reaction force against the twist of the stabilizer or the like, the electric motor rotates, and the torque thereof causes the electric motor to function as an electric generator. In the stabilizer control device, the vehicle behavior (the state of roll, the state of road surface disturbance, etc.) is detected by the vehicle behavior detection device. Then, in the stabilizer control device, the regenerative current of the electric motor is set by the regenerative current setting device on the basis of the detected vehicle behavior, and the regenerative current of the electric motor is adjusted by the regenerative current adjusting device so that the set regenerative current is reached. Therefore, the regenerative current generated by the electric motor can be continuously adjusted, so that the regenerative resistance provided by the electric motor changes. Thus, the electromagnetic braking force can be variably controlled. By causing the electromagnetic braking force to act when the stabilizer is twisted or returned, the twist or return of the stabilizer can be restrained or accelerated. Thus, in the stabilizer control device, the speed and the rigidity of the stabilizer in the twisting direction and the returning direction can be controlled by variably controlling the regenerative current (electromagnetic braking force) in accordance with the vehicle behavior. Since the regeneration of the electric motor utilizes the spring reaction force of the stabilizer, which is a passive element, and the spring reaction force of the suspension, the regenerative control of the electric motor can change the stabilizer with high response with respect to changes in the vehicle behavior. Therefore, a roll control that does not cause an uncomfortable feeling to an occupant of the vehicle and improved ride comfort can be realized. Furthermore, problems, such as electric power consumption and vibrations due to the driving of the electric motor, and the like, can also be resolved.

In the above-described stabilizer control device, the vehicle behavior detection device may detect an amount of roll of a vehicle, and the regenerative current setting device may set a larger regenerative current when the amount of roll detected by the vehicle behavior detection device is large than when the amount of roll detected by the vehicle behavior detection device is small.

In the stabilizer control device, the amount of roll (the lateral acceleration, and the like) of the vehicle is detected by the vehicle behavior detection device. Then, in the stabilizer control device, the regenerative current set by the regenerative current setting device is increased when a greater amount of roll is detected, and the regenerative current of the electric motor is adjusted by the regenerative current adjusting device so that the increased regenerative current is reached when the detected amount of roll is relatively large. Therefore, the electromagnetic braking force generated by the regeneration of the electric motor is greater, so that the stabilizer is harder to twist when the stabilizer is in a twisting-direction change, and is relatively hard to return when the stabilizer is in a returning-direction change (i.e., the speed of change of the stabilizer becomes slow). In consequence, the roll can be restrained, and the steering stability can be improved.

In the above-described stabilizer control device, the vehicle behavior detection device detects the magnitude of changes in vehicle behavior caused by a disturbance present on the road surface. The regenerative current setting device sets a lower regenerative current when the magnitude of the change in the disturbance-caused vehicle behavior is large than when the magnitude of the change is small.

In the stabilizer control device, change in vehicle behavior caused by the disturbance on the road surface is detected by the vehicle behavior detection device. Then, in the stabilizer control device, the regenerative current setting device sets a smaller regenerative current when the detected disturbance-caused vehicle behavior change is large than when the detected disturbance-caused vehicle behavior change is small, and the regenerative current of the electric motor is adjusted by the regenerative current adjusting device so that the smaller regenerative current is reached when the detected disturbance-caused vehicle behavior change is relatively large. Therefore, the electromagnetic braking force generated by the regeneration of the electric motor becomes smaller, so that the stabilizer is relatively easy to twist when the stabilizer is in a twisting-direction change, and is relatively easy to return when the stabilizer is in a returning-direction change (i.e., the speed of change of the stabilizer is faster). As a consequence, the ride comfort against the road surface disturbance is improved.

In the above-described stabilizer control device, if a spring reaction force of the suspension is greater than the required control amount of the electric motor when the stabilizer is in a returning direction, the regenerative current setting device may set the regenerative current to a target control amount that is equal to the difference between the reaction force of a spring of the suspension and the required control amount.

In the stabilizer control device, if the spring reaction force of the suspension is greater than the required control amount of the electric motor when the stabilizer is in a returning-direction change, the regenerative current is set to a target control amount that is equal to the difference between the reaction of the spring of the suspension and the required control amount, by the regenerative current setting device. Then, the stabilizer is controlled by the regeneration of the electric motor. The required control amount of the electric motor is a required control when the stabilizer is controlled by the driving of the electric motor, and is set on the basis of the vehicle behavior and the like. If the reaction force of the spring exceeds the required control amount when the stabilizer is returning to the neutral position, the control amount provided by the driving control of the electric motor is excessively large, so that the roll rigidity of the stabilizer cannot be accurately controlled. Therefore, the stabilizer is controlled by the regenerative control of the electric motor through the use of the spring reaction force of the suspension, so that the roll rigidity of the stabilizer is produced with high precision.

The above-described stabilizer control device may further comprise a turning amount detection device that detects a turning amount of the vehicle, wherein if the turning amount detected by the turning amount detection device exceeds a predetermined turning state amount, a switch from drive by the electric motor to regeneration is made.

In the stabilizer control device, the turning amount (the lateral acceleration, the steering speed, etc.) of the vehicle is detected by the turning amount detection device. Then, if the detected turning amount exceeds the predetermined turning amount, the stabilizer control device switches from the drive by the electric motor to the regeneration, and controls the stabilizer by the regeneration of the electric motor. The rotation speed provided by the driving of the electric motor has a limitation depending on the specifications of the electric motor. Therefore, when the turning amount sharply changes and there is a need to rapidly change the stabilizer in the twisting direction or the returning direction, the driving control of the electric motor may not be able to follow the rapid change due to the performance of the electric motor. Therefore, the regenerative control of the electric motor, which provides better response performance, is used to cope with the rapid change of the stabilizer. The predetermined turning amount is a turning amount that makes it impossible for the driving of the electric motor to respond to changes in the stabilizer, and is set, taking into account the performance of the electric motor and the like.

In the stabilizer control device, if a stored electricity amount drops below a predetermined stored electricity amount, the electric motor may switch from drive to regeneration.

In the stabilizer control device, if the stored electricity amount of the vehicle drops below the predetermined stored electricity amount, the electric motor switches from the drive to the regeneration, and the stabilizer is controlled by the regeneration of the electric motor. Due to the regeneration of the electric motor, electric power is generated, and the stored electricity amount in the vehicle is recovered. The predetermined stored electricity amount is a minimum stored electricity amount that is needed in the vehicle, and is set, taking into account the electric power consumption in the vehicle and the like.

In the above-described stabilizer control device, it is possible to adopt a construction in which if a stored electricity amount becomes greater than or equal to a predetermined stored electricity amount, regeneration by the electric motor is not performed.

In this stabilizer control device, if the stored electricity amount of the vehicle is greater than or equal to the predetermined stored electricity amount, the electric motor switches from the regeneration mode to the driving mode, and the stabilizer may be controlled by the driving of the electric motor. Because the stored electricity amount in the vehicle is abundant, the stabilizer may be actively controlled by the driving of the electric motor.

A second aspect of the invention is drawn to a method for controlling the roll rigidity of a stabilizer by detecting the behavior of a vehicle, setting a regenerative current of an electric motor so that the electric motor generates a regenerative current based on the detected vehicle behavior, and then adjusting the regenerative current of the electric motor so that the regenerative current is reached. Thus, as described above, the regenerative resistance provided by the electric motor may be adjusted to control the speed and the rigidity of the stabilizer in the twisting direction and the returning direction in accordance with the vehicle behavior.

In the stabilizer control method according to the invention, the vehicle behavior that is detected may be the amount of roll of the vehicle. A higher regenerative current may be set when the amount of roll detected is large than when the detected amount of roll is small. Consequently, the roll can be restrained, and the steering stability can be improved in the manner described above.

According to the second aspect, the magnitude of changes in vehicle behavior caused by a disturbance present on the road surface may also be detected. Again, a lower regenerative current may be set when the magnitude of the change in the disturbance-caused vehicle behavior is large than when the magnitude of the change is small. Thus, the ride comfort of the vehicle may be improved.

In the stabilizer control method, if a spring reaction force of the suspension is greater than the required control amount of the electric motor when the stabilizer is returning, the regenerative current may be set to a target control amount that is equal to the difference between the reaction force of a spring of the suspension and the required control amount.

The above-described control method may further detect the turning amount of the vehicle, wherein if the turning amount detected exceeds a predetermined turning amount, the electric motor switches from drive to regeneration. Thus, by controlling the regenerative function of the electric motor, which provides better response performance, is used to cope with the rapid change of the stabilizer.

In the stabilizer control method, the amount of electricity stored in a battery may be monitored, and if the stored amount falls below a prescribed amount, the electric motor is controlled to switch from drive to regeneration. Thus, electric power is generated, and the stored electricity amount in the vehicle is recovered. Generally, the predetermined stored electricity amount is a minimum stored electricity amount that is needed in the vehicle, and is set, taking into account the electric power consumption in the vehicle and the like.

In addition, according to the stabilizer control method, if a stored electricity amount is greater than or equal to a predetermined stored electricity amount, the electric motor does not switch from drive to regeneration.

If the stored electricity amount of the vehicle is greater than or equal to the predetermined stored electricity amount, the stabilizer may be controlled by the driving of the electric motor, which permits active control.

Thus, it is possible to control the speed and the rigidity of the stabilizer in the twisting direction and the returning direction by variably controlling the regenerative current (electromagnetic braking force) of the electric motor and therefore control the stabilizer with high response.

BRIEF DESCRIPTION OF THE DRAWINGS

The foregoing and further objects, features, and advantages of the invention will become apparent from the following descriptions of preferred embodiments with reference to the accompany drawings, wherein like numerals are used to represent like elements and wherein.

DETAILED DESCRIPTION OF THE INVENTION

Figure 1:
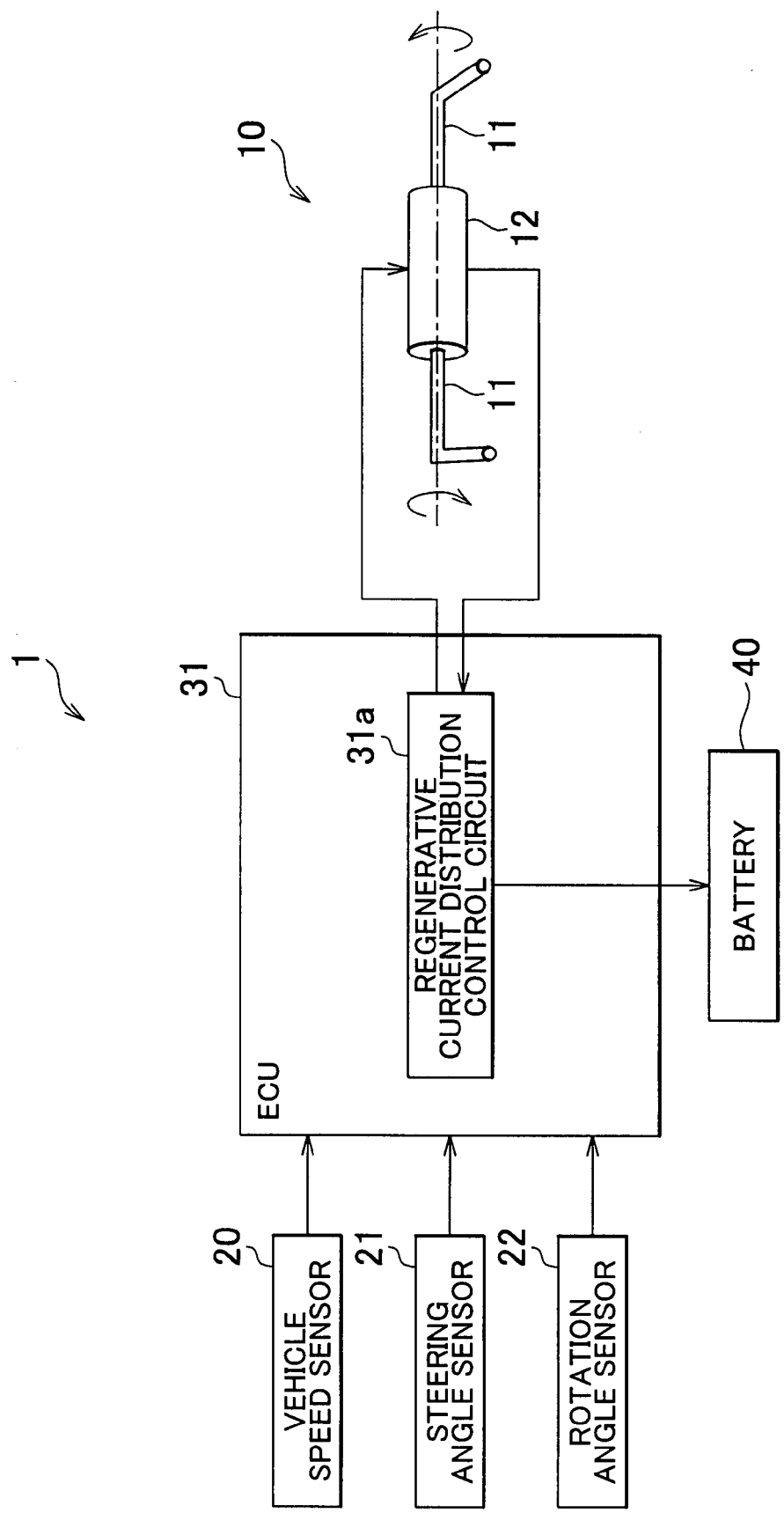
FIG. 1 is a construction diagram of an active stabilizer in accordance with a first embodiment.

An example embodiment of the stabilizer control device in accordance with the invention will be described in detail hereinafter with reference to the accompanying drawings. In the figures, the same reference numerals are used for identifying the same or corresponding components, elements or portions, of which explanation will not be repeated.

In one embodiment, the stabilizer control device in accordance with the invention is applied to an active stabilizer installed in a vehicle. The active stabilizer in accordance with the embodiment controls the stabilizer at least through the use of regeneration of an electric motor. In a first embodiment, only a regenerative control of an electric motor is executed. In the second embodiment, a driving control of an electric motor is ordinarily executed, and a regenerative control of the electric motor is executed only under predetermined conditions. In addition, the stabilizer may be provided only for the front wheels, or for both the front wheels and the rear wheels.

With reference to FIG. 1, an active stabilizer 1 in accordance with the first embodiment will be described. FIG. 1 is a construction diagram of the active stabilizer in accordance with the first embodiment.

The active stabilizer 1 controls changes in the twisting direction and the returning direction of the stabilizer through the use of the electromagnetic braking force generated by the regeneration of an electric motor. In the active stabilizer 1, the lateral acceleration (state of roll) and the road surface disturbance are estimated as vehicle behaviors, and the regenerative current of the electric motor is control on the basis of the vehicle behaviors. To that end, the active stabilizer 1 comprises a stabilizer 10, a vehicle speed sensor 20, a steering angle sensor 21, a rotation angle sensor 22, and an ECU (Electronic Control Unit) 31.

The stabilizer 10 is made up of a left and right stabilizer bars 11, 11, and an actuator 12. An end of each stabilizer bar 11 is linked to the suspension, and an intermediate portion thereof is fixed to the vehicle body. In addition, another end of each stabilizer bar 11 is connected to the actuator 12, so that the electromagnetic braking force from the actuator 12 acts on the stabilizer bar 11. The actuator 12 comprises an electric motor and a speed reducer. One of the stabilizer bars 11 is connected to a rotor side of the electric motor, and the other stabilizer bar 11 is connected to a stator side of the electric motor. The actuator 12 changes the speed of change and the torsional rigidity (and therefore the roll rigidity) of the stabilizer bars 11 on both sides by adjusting the electromagnetic braking force generated by the motor regeneration. The stabilizer 10 twists in accordance with the vehicle behavior. Thus, the electromagnetic braking force controls the speed of change when the stabilizer 10 is twisted as well as the speed of change when the stabilizer 10 is returned.

The electric motor of the actuator 12 may also function as a generator, and has a regenerative function. The spring reaction force of the stabilizer bars 11 and the spring reaction force of the suspension rotate the electric motor, the torque of the rotation is used to generate electric power in the electric motor. This provides regenerative resistance that acts as electromagnetic braking force against changes of the stabilizer bars 11 in the twisting direction or returning direction. The electric motor is controlled by a regenerative current distribution control circuit 31a to generate a target regenerative current that is set by the ECU 31. The greater the regenerative current, the greater the regenerative resistance and the greater the electromagnetic braking force.

The spring reaction force of the stabilizer bars 11 and the spring reaction force of the suspension generate the electromagnetic braking. These spring reaction forces are generated in accordance with changes in vehicle behavior. Therefore, the electromagnetic braking force is a force generated by changes in vehicle behavior, and exhibits high response performance with respect to vehicle behavior.

The vehicle speed sensor 20 detects the speed of the vehicle, and sends the detection value thereof as a vehicle speed signal to the ECU 31. The steering angle sensor 21 detects the steering angle (or, the steered angle of a steered road wheel), and sends the detected value thereof as a steering angle signal to the ECU 31. The rotation angle sensor 22 detects the rotation angle of the electric motor of the actuator 12, and sends the detection value thereof as a rotation angle signal to the ECU 31. On the basis of the rotation angle of the electric motor, the angle of the stabilizer bars 11, 11 (hereinafter, referred to as "stabilizer angle") is determined.

The ECU 31 is an electronic control unit made up of a CPU (Central Processing Unit), a ROM (Read-Only Memory), a RAM (Random Access Memory), the regenerative current distribution control circuit 31a, etc., and functions as a control device of the active stabilizer 1. The ECU 31 receives the detection signals from the various sensors 20, 21, 22, and estimates vehicle behaviors (the lateral acceleration, and the disturbance from the road surface) on the basis of the detection signals. Then, the ECU 31 sets a target regenerative current on the basis of the estimated vehicle behaviors, and controls the electric motor of the actuator 12 so that the target regenerative current is generated.

The regenerative current distribution control circuit 31a comprises FETs (Field Effect Transistors), variable resistances, etc. The regenerative current distribution control circuit 31a changes the resistance value of the variable resistances in accordance with the target regenerative current that is set in the ECU 31, to control the electric motor of the actuator 12 so that the target regenerative current is reached. Then, the regenerative current distribution control circuit 31a supplies the thus-generated regenerative current generated to a battery 40. In the battery 40, electricity is stored because of the regenerative current supplied to the battery 40.

The ECU 31 estimates the lateral acceleration that acts on the vehicle, on the basis of the vehicle speed represented by the vehicle speed signal and the steer angle represented by the steer angle signal. Furthermore, the ECU 31 computes the stabilizer angle of each of the left and right stabilizer bars 11, 11 on the basis of the rotation angle of the electric motor represented by the rotation angle signal. Then, the ECU 31 monitors the time-dependent change in each stabilizer angle, and detects a vehicle vibration (road surface disturbance) from the time-dependent change in each stabilizer angle.

The ECU 31 determines whether or not the lateral acceleration is greater than or equal to a predetermined lateral acceleration. If it is greater than or equal to the predetermined lateral acceleration, the ECU 31 sets a target regenerative current that is intended to improve the steering stability. If it is less than the predetermined lateral acceleration, the ECU 31 sets a target regenerative current that is intended to improve ride comfort. The predetermined lateral acceleration is a value for determining whether there is a need to restrain the roll that is presently caused by the turning of the vehicle, and is set beforehand through experiments or the like. Therefore, when the lateral acceleration is less than the predetermined lateral acceleration, the ECU 31 determines that the vehicle is traveling straight or gently turning, that is, the ECU 31 determines that there is minimal roll that would adversely affect the steering stability.

If a target regenerative current to improve the steering stability will be set, the ECU 31 determines whether the estimated lateral acceleration is increasing. If the lateral acceleration is increasing, the ECU 31 sets a greater target regenerative current than in the previous setting operation. If the lateral acceleration is not increasing, the ECU 31 sets the same target regenerative current as in the previous setting operation. On this occasion, the ECU 31 refers to a lateral acceleration-target stabilizer angle map, and extracts a target stabilizer angle from the lateral acceleration-target stabilizer angle map that is appropriate for the estimated lateral acceleration. Then, the ECU 31 computes a target electromagnetic braking force that is needed to achieve the extracted target stabilizer angle. Furthermore, the ECU 31 computes the target regenerative current that is needed to generate the target electromagnetic braking force. The lateral acceleration-target stabilizer angle map is a map in which stabilizer angles of the stabilizer bars 11 needed in order to restrain the roll state that occurs in accordance with the lateral acceleration are set. The map is set beforehand through experiments, simulations, etc.

If a target regenerative current intended to improve the ride comfort will be set, the ECU 31 determines whether the estimated road surface disturbance is increasing. If the road surface disturbance is increasing, the ECU 31 sets a smaller target regenerative current than in the previous setting operation. If the road surface disturbance is not increasing, the ECU 31 sets the same target regenerative current as in the previous setting operation. On this occasion, the ECU 31 refers to a road surface disturbance-target stabilizer angle map, and extracts an appropriate target stabilizer angle for the estimated road surface disturbance. Then, the ECU 31 computes the target electromagnetic braking force that is needed in order to achieve the extracted target stabilizer angle. Furthermore, the ECU 31 computes the target regenerative current that is needed in order to generate the target electromagnetic braking force. The road surface disturbance-target stabilizer angle map is a map in which stabilizer angles of the stabilizer bars 11 needed in order to improve the ride comfort in accordance with the road surface disturbance are set. The map is set beforehand through experiments, simulations, etc.

Figure 2:
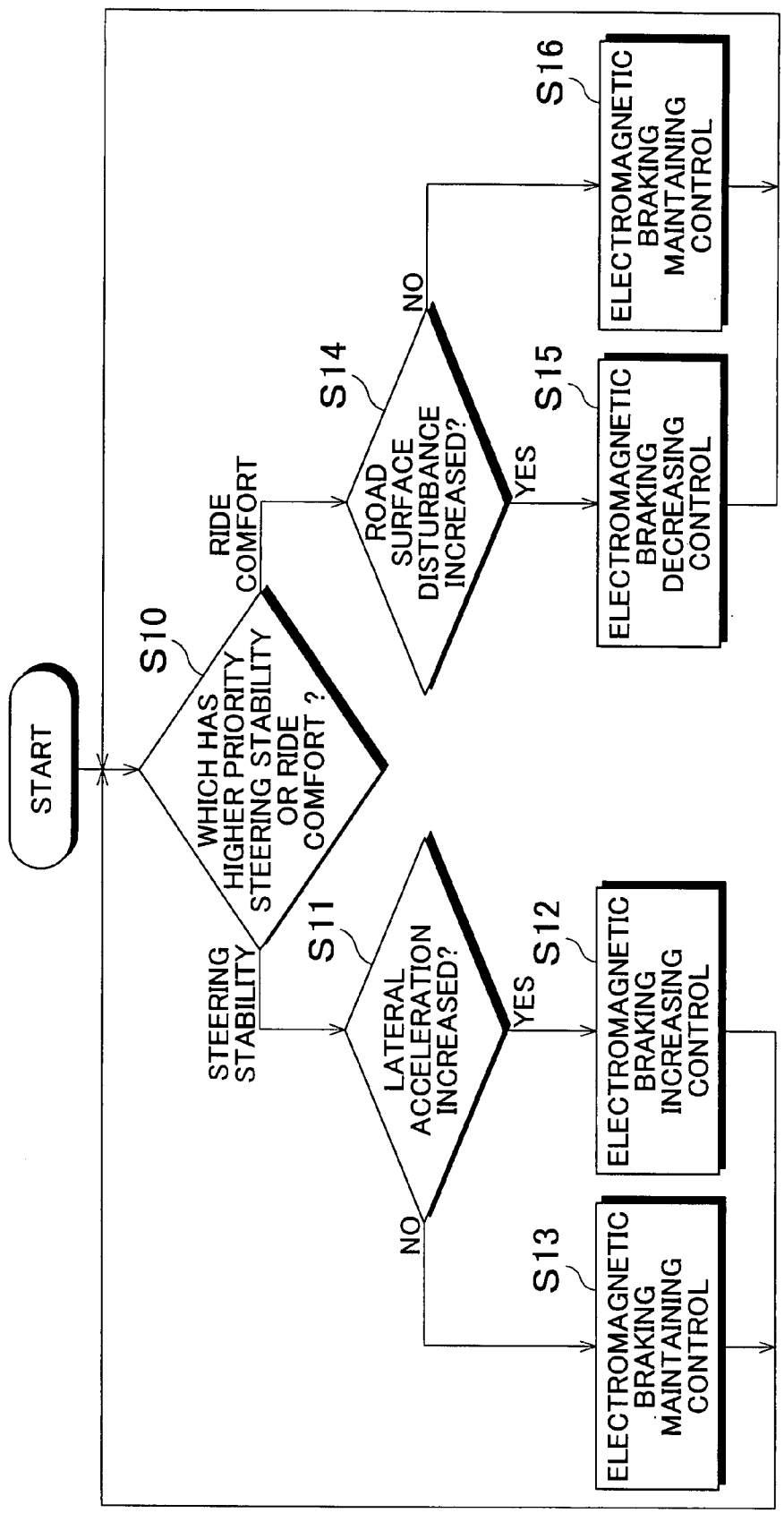
FIG. 2 is a flowchart showing a flow of control executed in the active stabilizer in accordance with the first embodiment.

Operations in the active stabilizer 1 will be described with reference to FIG. 1, along with a flowchart shown in FIG. 2. FIG. 2 is a flowchart showing a flow of control executed in the active stabilizer in accordance with the first embodiment. The active stabilizer 1 repeatedly performs the below-described operations at regular intervals.

The vehicle speed sensor 20 detects the vehicle speed, and sends the vehicle speed signal representing the vehicle speed to the ECU 31. The steering angle sensor 21 detects the steering angle, and sends the steering angle signal representing the steering angle to the ECU 31. The rotation angle sensor 22 detects the rotation angle of the electric motor, and sends the rotation angle signal representing the rotation angle to the ECU 31.

The ECU 31 estimates the lateral acceleration on the basis of the vehicle speed and the steering angle. Besides, the ECU 31 computes the stabilizer angles of the two stabilizer bars 11, 11 on the basis of the rotation angle of the electric motor, and estimates the road surface disturbance from the time-dependent change in the stabilizer angles.

The ECU 32 determines whether the present lateral acceleration is greater than or equal to a predetermined lateral acceleration (S10), in order to determine whether the steering stability or the ride comfort should have higher priority.

If it is determined in S10 that the present lateral acceleration is greater than or equal to the predetermined lateral acceleration (if steering stability has a higher priority), the ECU 31 then determines whether or not the present lateral acceleration has increased from the previous value (S11). If it is determined in S11 that the present lateral acceleration has increased (that is, if the amount of roll has increased), the ECU 31 executes the following operation in order to increase the electromagnetic braking force. That is, the ECU 31 refers to the lateral acceleration-target stabilizer angle map, and extracts the appropriate target stabilizer angle for the present lateral acceleration (the target stabilizer angle being greater than the previous value), and computes a target electromagnetic braking force that is needed in order to achieve the target stabilizer angle, and further computes a target regenerative current (the target regenerative current being greater than the previous value) (S12). On the other hand, if it is determined in S11 that the present lateral acceleration has not increased, the ECU 31 sets the target regenerative current at the previous value in order to maintain the electromagnetic braking force (S13).

If it is determined in S10 that the present lateral acceleration is less than the predetermined lateral acceleration (if ride comfort has higher priority), the ECU 31 then determines whether the present road surface disturbance has increased from the previous value (S14). If it is determined in S14 that the present road surface disturbance has increased, the ECU 31 executes the following operation in order to decrease the electromagnetic braking force. That is, the ECU 31 refers to the road surface disturbance-target stabilizer angle map, and extracts the appropriate target stabilizer angle for the present road surface disturbance (the target stabilizer angle being smaller than the previous value), and computes a target electromagnetic braking force that is needed in order to achieve the target stabilizer angle, and further computes a target regenerative current (the target regenerative current being smaller than the previous value) (S15). On the other hand, if it is determined in S14 that the present road surface disturbance has not increased, the ECU 31 sets the target regenerative current at the previous value in order to maintain the electromagnetic braking force (S16).

The regenerative current distribution control circuit 31a changes the resistance value of the variable resistance in accordance with the target regenerative current, and controls the rotation of the electric motor of the actuator 12. Through the control by the regenerative current distribution control circuit 31a, the electric motor of the actuator 12 rotates due to the spring reaction force of the stabilizer bars 11 and the spring reaction force of the suspension, and generates regenerative current so as to achieve the target regenerative current. Consequently, the electromagnetic braking force in accordance with the generated regenerative current acts on the stabilizer 10. In addition, the regenerative current distribution control circuit 31a takes in the generated regenerative current, and stores the regenerative current into the battery 40. Incidentally, in order to generate the target regenerative current, a feed-forward control may be employed, or a feedback control using the actual rotation angle of the electric motor, the stabilizer angle, etc., may be employed.

In the electromagnetic braking increasing control, the regenerative current generated by the electric motor of the actuator 12 increases, which increases the regenerative resistance, and the electromagnetic braking force. Therefore, the speed of change of the stabilizer 10 is reduced, which makes the stabilizer 10 more resistant to twisting when a change is in the twisting direction, and more difficult to return when a change is in the returning direction. As a result, the roll resistance of the vehicle is increased, and the steering stability improves.

In the case of electromagnetic braking decreasing control, the regenerative current generated by the electric motor of the actuator 12 decreases, which reduces the regenerative resistance and the electromagnetic braking force. Therefore, the speed of change of the stabilizer 10 increases, so that the stabilizer 10 responds more quickly to changes in the twisting direction, and is relatively easy to return when a change is in the returning direction. As a result, the ride comfort improves.

The active stabilizer 1 continuously controls the electromagnetic braking force that acts on the stabilizer 10, by controlling the regenerative current of the electric motor of the actuator 12. Therefore, the active stabilizer 1 is able to control the speed and the torsional rigidity of the stabilizer in the twisting direction and the returning direction, and achieves high response in accordance with the vehicle behavior. Furthermore, because the active stabilizer 1 performs the control only by the regenerative operation of the electric motor, there is no vibration caused by driving the electric motor, and electric power can be stored.

Furthermore, the active stabilizer 1 controls the electromagnetic braking force in accordance with one of the steering stability and the ride comfort that has the higher priority, so that improved steering stability and improved ride comfort can both be achieved. Therefore, in addition to the high response performance, vehicle occupants will receive roll feeling without uncomfortable feeling, and feeling of high ride comfort.

Figure 3:
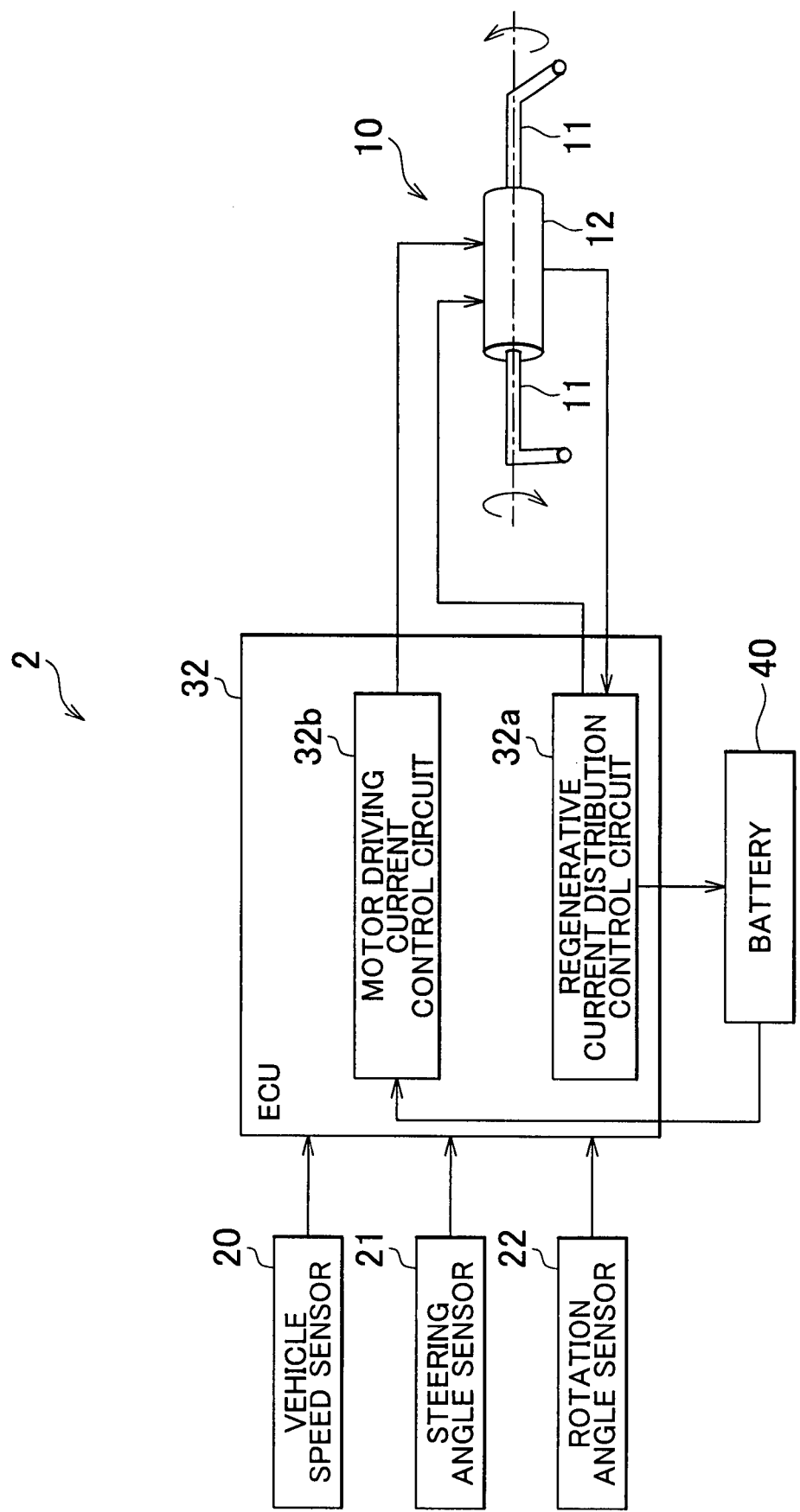
FIG. 3 is a construction diagram of an active stabilizer in accordance with a second embodiment.
Figure 4:
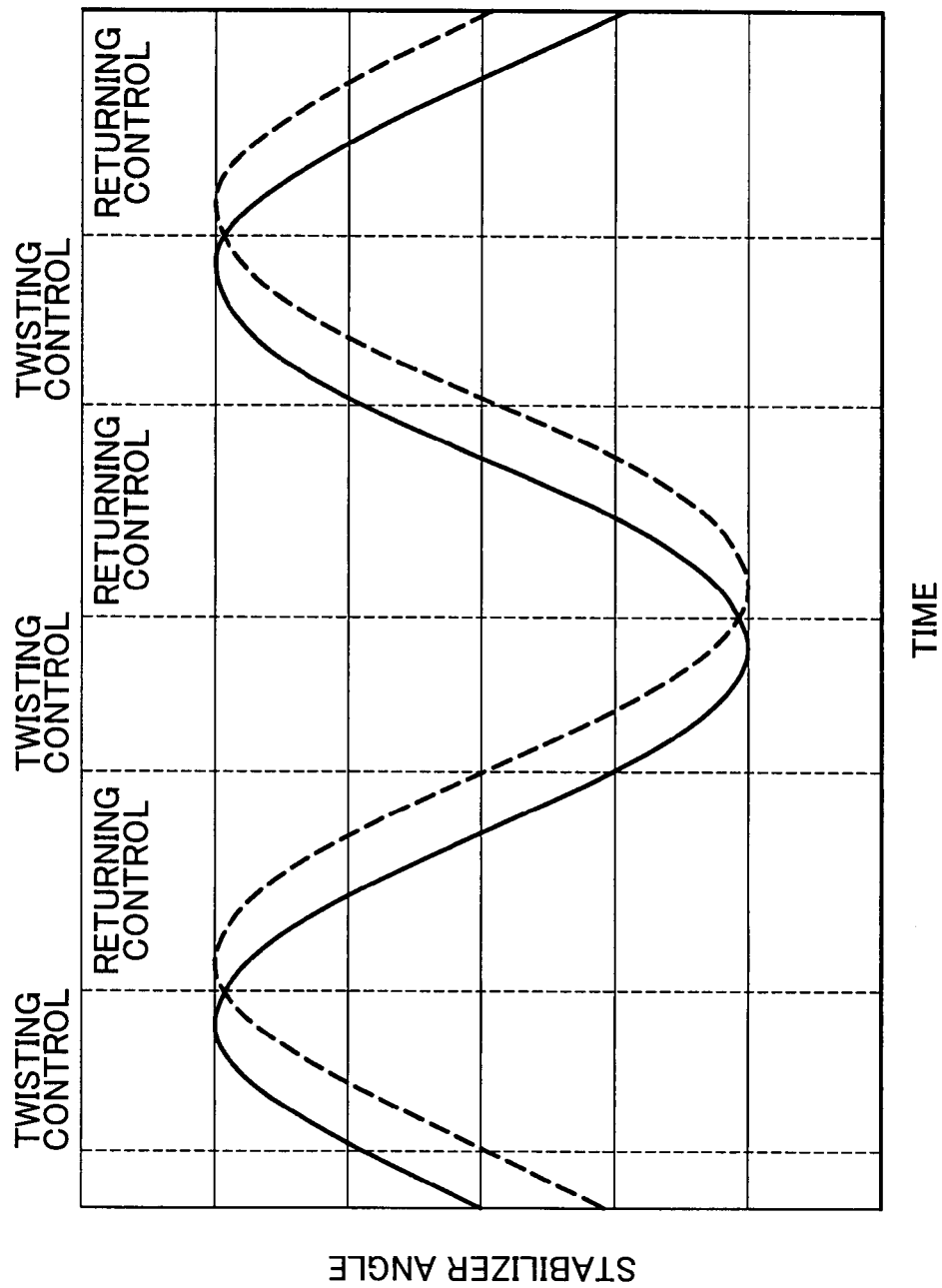
FIG. 4 shows an example of time-dependent changes in the target stabilizer angle and in the actual stabilizer angle.
Figure 5:
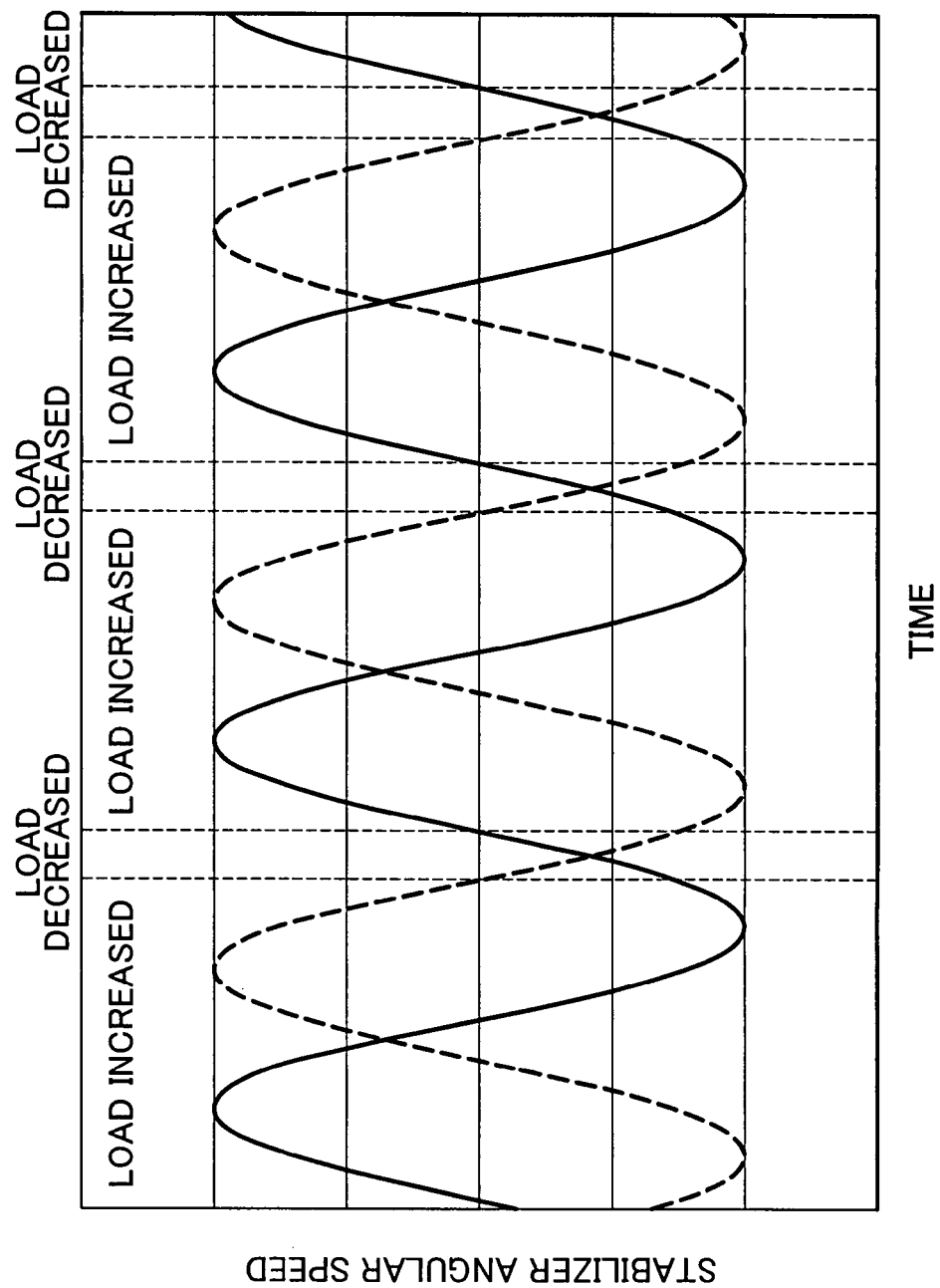
FIG. 5 shows an example of time-dependent changes in the target stabilizer angular speed and in the actual stabilizer angular speed.

With reference to FIGS. 3 to 5, an active stabilizer 2 in accordance with the second embodiment will be described. FIG. 3 is a construction diagram of an active stabilizer in accordance with the second embodiment. FIG. 4 shows an example of time-dependent changes in the target stabilizer angle and in the actual stabilizer angle. FIG. 5 shows an example of time-dependent changes in the target stabilizer angular speed and in the actual stabilizer angular speed. With regard to the active stabilizer 2, constructions similar to those of the active stabilizer 1 in accordance with the first embodiment are denoted by the same reference characters, and will not be redundantly described.

The active stabilizer 2 controls the changes in the twisting direction and the returning direction of the stabilizer through the use of the drive and regeneration of an electric motor. In particular, the active stabilizer 2 controls the change of the stabilizer in the returning direction through the use of the electromagnetic braking force caused by the motor regeneration, only when the spring reaction force of the suspension is greater than the motor required control amount in the case where the load has decreased during the return control of the stabilizer. To that end, the active stabilizer 2 comprises a stabilizer 10, a vehicle speed sensor 20, a steering angle sensor 21, a rotation angle sensor 22, and an ECU 32.

An electric motor of an actuator 12 is similar to the electric motor used in the first embodiment, but is driven with electric power supplied. The electric motor is supplied with a current from a motor driving current control circuit 32b so that a target motor current set by the ECU 32 is reached. This driving power (torque) of the electric motor is transferred to stabilizer bars 11, and acts on change in the twisting direction or the returning direction. The greater the supplied current, the greater the torque of the electric motor (the faster the rotation speed) becomes and the greater the torque that acts on the stabilizer bars 11 becomes.

The ECU 32 is an electronic control unit made up of a CPU, a ROM, a RAM, a regenerative current distribution control circuit 32a, the motor driving current control circuit 32b, etc., that functions as a control device of the active stabilizer 2. The ECU 32 takes in detection signals from the various sensors 20, 21, 22, and estimates vehicle behaviors (lateral acceleration, and the like), and the load exerted on the stabilizer bars 11, and the spring reaction force of the suspension, on the basis of the detection signals. Then, the ECU 32 determines whether the motor driving control or the motor regeneration control should be executed, based on the estimated states of the vehicle, and accordingly executes the driving control or the regenerative control of the electric motor of the actuator 12.

The regenerative current distribution control circuit 32a is similar to the regenerative current distribution control circuit 31a used in the first embodiment.

The motor driving current control circuit 32b comprises FETs and the like. The motor driving current control circuit 32b takes in electric power from the battery 40, and supplies current to the electric motor of the actuator 12 so that the target motor current set by the ECU 32 is reached.

The ECU 32 estimates the lateral acceleration, the stabilizer angle, and the road surface disturbance, through processes similar to those of the ECU 31 in the first embodiment. Then, the ECU 32 computes a stabilizer angular speed from a time-dependent change in the stabilizer angle. Furthermore, the ECU 32 estimates the load exerted on the stabilizer bars 11, on the basis of the stabilizer angle. In addition, the ECU 32 estimates the spring reaction force of the suspension on the basis of the lateral acceleration.

The ECU 32 determines whether to execute the twisting control or the return control. When the twisting control will be executed, the target stabilizer angle is greater than the actual stabilizer angle because the twisting control is executed when the stabilizer bars 11 are twisted from the neutral position. When the return control will be executed, the actual stabilizer angle is greater than the target stabilizer angle because the return control is executed when the stabilizer bars 11 are returned to the neutral position. Therefore, the ECU 32 refers to the lateral acceleration-target stabilizer angle map, and extracts the appropriate target stabilizer angle for the estimated lateral acceleration. Then, the ECU 32 subtracts the absolute value of the actual stabilizer angle (estimated value) from the absolute value of the target stabilizer angle. If the subtraction value is greater than 0, the ECU 32 determines that the twisting control will be executed. If the subtraction value is less than or equal to 0, the ECU 32 determines that the return control will be executed. If it is determined that the twisting control will be executed, the ECU 32 executes the twisting control through a motor driving control.

FIG. 4 shows an example of time-dependent changes in the target stabilizer angle and in the actual stabilizer angle, where the target stabilizer angle is shown by a solid line and the actual stabilizer angle is shown by a broken line. In FIG. 4, in regions where the target stabilizer angle is greater than the actual stabilizer angle, the twisting control is executed. In regions where the target stabilizer angle is smaller than the actual stabilizer angle, the return control is executed.

If it is determined that the returning-side control will be executed, the ECU 32 then determines whether the load on the stabilizer 10 is decreasing or increasing. A decreasing load indicates that the vehicle is returning to a position parallel to the ground surface, and an increasing load indicates that the vehicle is tilting relative to the ground surface. Therefore, when the load is decreasing, the actual stabilizer angle is decreasing and therefore the actual stabilizer angular speed is smaller than 0. Therefore, the ECU 32 refers to the lateral acceleration-target stabilizer angle map, and serially extracts target stabilizer angles in accordance with the estimated lateral acceleration, and computes a target stabilizer angular speed from the time-dependent change of the target stabilizer angle. Then, the ECU 32 determines whether the target stabilizer angular speed is less than or equal to 0 and the actual stabilizer angular speed is less than or equal to 0. If this condition is satisfied, the ECU 32 determines that the load is decreasing. If this condition is not satisfied, the ECU 32 determines that the load is increasing. If it is determined that the load is increasing, the ECU 32 executes an ordinary return control through the motor driving control.

Incidentally, the condition that the target stabilizer angular speed be less than or equal to 0 is added for the following reason. If during the twisting control the actual stabilizer angle temporarily overtakes the target stabilizer angle, the returning-side control through the motor regeneration control is not executed, and the next twisting control is awaited. That is, if the actual stabilizer angle temporarily overtakes the target stabilizer angle, the load (actual stabilizer angular speed) is expected to immediately begin to increase, and therefore the return control is not executed.

FIG. 5 shows an example of time-dependent changes in the target stabilizer angular speed and in the actual stabilizer angular speed, where the target stabilizer angular speed is shown by a solid line and the actual stabilizer angular speed is shown by a broken line. In regions where the target stabilizer angular speed is less than or equal to 0 and the actual stabilizer angular speed is less than or equal to 0, the load is decreasing. In other regions, the load is increasing.

If it is determined that the load is decreasing during the return control, the ECU 32 then determines whether the return control will be executed through the motor driving control or through the motor regeneration control. If the ordinary driving control is executed in the case where the spring reaction force of the suspension is greater than the required control amount when the load is decreasing during the return control, the control amount becomes excessive, and a targeted torsional rigidity cannot be accurately generated. In that case, therefore, the motor regeneration control is executed to utilize the electromagnetic braking force. Concretely, the ECU 32 refers to the lateral acceleration-target stabilizer angle map, and extracts an appropriate target stabilizer angle for the estimated lateral acceleration. Then, the ECU 32 computes the required motor driving power (required control amount) that is needed to achieve the target stabilizer angle. Furthermore, the ECU 32 determines whether the required control amount of the electric motor is greater than the spring reaction force of the suspension. If it is determined that the required control amount is greater than the spring reaction force of the suspension, the ECU 32 executes the return control through the motor driving control. If it is determined that the spring reaction force of the suspension is greater than or equal to the required control amount, the ECU 32 executes the return control through the motor regeneration control.

If the motor driving control will be executed, the ECU 32 refers to the lateral acceleration-target stabilizer angle map, and extracts an appropriate target stabilizer angle for the estimated lateral acceleration. Then, the ECU 32 computes a target motor driving power (target control amount) that is needed in order to achieve the extracted target stabilizer angle. On this occasion, the ECU 32 computes a required motor driving power (required control amount) that is needed in order to achieve the target stabilizer angle, and subtracts the spring reaction force of the suspension from the required motor driving power, and sets the difference as a target motor driving power. Furthermore, the ECU 32 computes a target motor current that is needed in order to generate the target motor driving power.

If the motor regeneration control will be executed, the ECU 32 refers to the lateral acceleration-target stabilizer angle map, and extracts an appropriate target stabilizer angle for the estimated lateral acceleration. Then, the ECU 32 computes a target electromagnetic braking force (target control amount) that is needed in order to achieve the extracted target stabilizer angle. On this occasion, the ECU 32 computes a required electromagnetic braking force (required control amount) that is needed in order to achieve the target stabilizer angle, and subtracts the required electromagnetic braking force from the spring reaction force of the suspension, and sets the difference as a target electromagnetic braking force. Furthermore, the ECU 32 computes a target regenerative current that is needed in order to generate the target electromagnetic braking force.

Incidentally, the lateral acceleration-target stabilizer angle map is similar to the map used in first embodiment. In addition to the lateral acceleration, the road surface disturbance may also be taken into account in executing the control as in the first embodiment.

Figure 6:
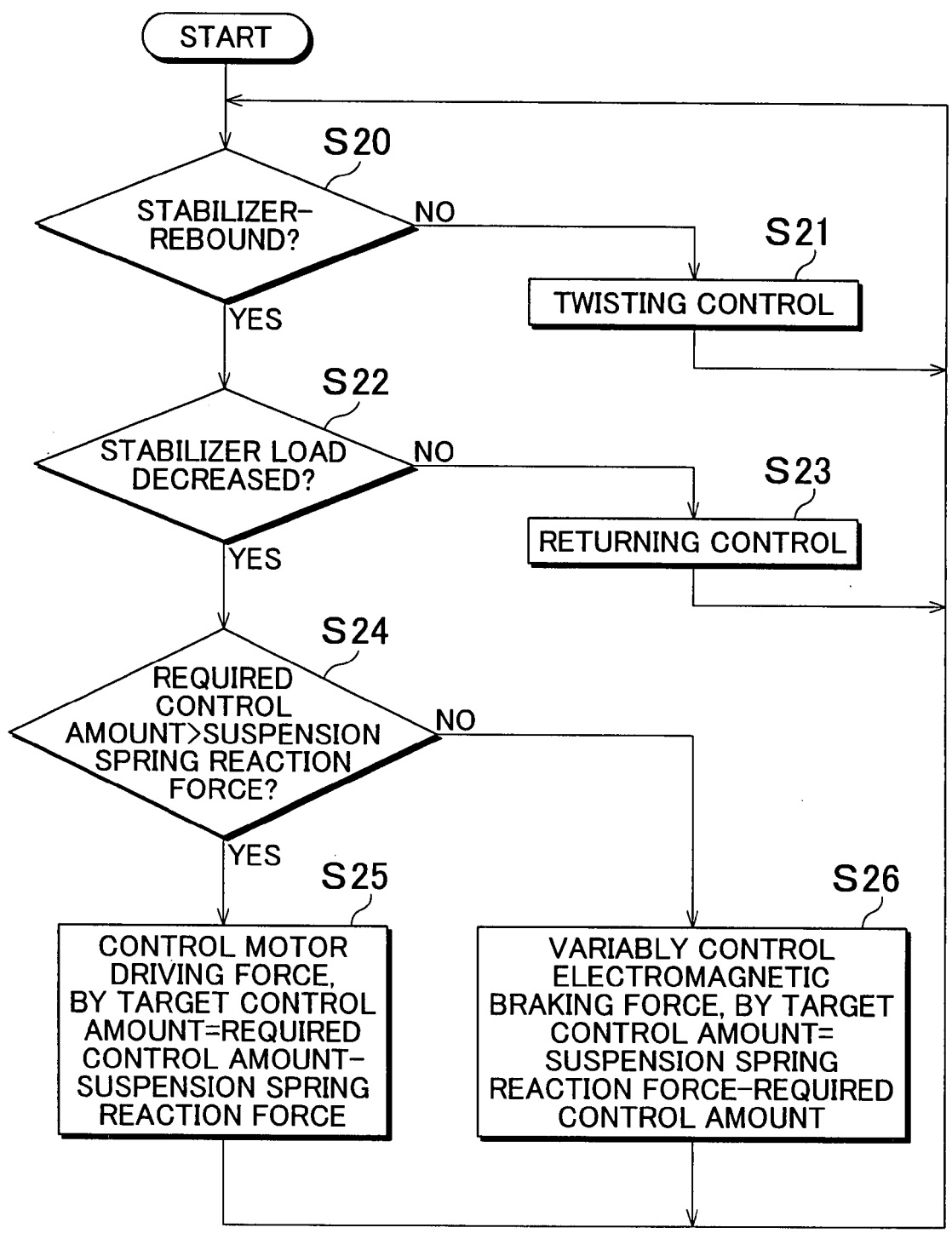
FIG. 6 is a flowchart showing a flow of control executed in an active stabilizer in accordance with the second embodiment.

Operations in the active stabilizer 2 will be described with reference to FIG. 3, along with a flowchart shown in FIG. 6. FIG. 6 is a flowchart showing a flow of control executed in an active stabilizer in accordance with the second embodiment. The active stabilizer 2 repeatedly executes the below-described operations at regular intervals.

As in operations in the first embodiment, the sensors 20, 21, 22 perform their respective detections, and send detection signals representing detection values to the ECU 32.

The ECU 32 estimates the lateral acceleration, the stabilizer angle, and the road surface disturbance, as in the operations in first embodiment. Then, the ECU 32 computes a stabilizer angular speed from a time-dependent change in the estimated stabilizer angle. Furthermore, the ECU 32 estimates the load on the stabilizer bars 11 on the basis of the stabilizer angle. Furthermore, the ECU 32 estimates the spring reaction force of the suspension on the basis of the lateral acceleration.

The ECU 32 refers to the lateral acceleration-target stabilizer angle map, and extracts an appropriate target stabilizer angle for the estimated lateral acceleration. Then, the ECU 32 computes a target stabilizer angular speed from a time-dependent change in the estimated target stabilizer angle.

The ECU 32 subtracts the absolute value of the actual stabilizer angle from the absolute value of the target stabilizer angle, and determines whether or not the stabilizer 10 is returning on the basis of whether or not the difference is less than or equal to 0 (S20). If it is determined in S20 that the difference is greater than 0 (if the stabilizer 10 is twisting), the ECU 32 then executes the twisting control through the motor driving control (S21).

If it is determined in S20 that the subtraction value is less than or equal to 0 (if the stabilizer 10 is returning), the ECU 32 then determines whether or not the load on the stabilizer 10 is decreasing on the basis of whether the target stabilizer angular speed is less than or equal to 0 and the actual stabilizer angular speed is less than or equal to 0 (S22). If it is determined in S22 that the determination condition is not satisfied (if the stabilizer 10 is in the returning side and under the increasing load), the ECU 32 then executes the return control through the motor driving control (S23).

If it is determined in S22 that the determination condition is satisfied (if the stabilizer 10 is returning and under the decreasing load), the ECU 32 then determines whether the required control amount of the electric motor based on the target stabilizer angle is greater than the spring reaction force of the suspension (S24).

If it is determined in S24 that the required control amount is greater than the spring reaction force of the suspension, the ECU 32 then computes a required motor driving power (required control amount) that is needed in order to achieve the target stabilizer angle, and sets as a target motor driving power the difference obtained by subtracting the spring reaction force of the suspension from the required motor driving power, and computes a target motor current that is needed in order to generate the target motor driving power. In this case, because the required control amount of the electric motor is greater than the spring reaction force of the suspension, the change of the stabilizer bars 11 in the returning direction is controlled by the motor driving power.

On the other hand, if it is determined that the spring reaction force of the suspension is greater than or equal to the required control amount, the ECU 32 computes a required electromagnetic braking force (required control amount) that is needed in order to achieve the target stabilizer angle, and sets as a target electromagnetic braking force the difference obtained by subtracting the required electromagnetic braking force from the spring reaction force of the suspension, and computes a target regenerative current that is needed in order to generate the target electromagnetic braking force. In this case, since the spring reaction force of the suspension is greater, the spring reaction force is utilized so that the change of the stabilizer bars 11 in the returning direction is controlled by the electromagnetic braking force.

If the target motor current is set in the ECU 32, the motor driving current control circuit 32b supplies current to the electric motor of the actuator 12 so that the target motor current set by the ECU 32 is reached. Then, the electric motor of the actuator 12 is rotationally driven in accordance with the current supplied. As a consequence, the driving power (torque) by the electric motor acts on the stabilizer 10.

If the target regenerative current is set in the ECU 32, operations similar to those in the first embodiment are executed. That is, the regenerative current distribution control circuit 32a controls the rotation of the electric motor of the actuator 12 in accordance with the target regenerative current, and the electric motor of the actuator 12 generates regenerative current so that the target regenerative current is reached, and the electromagnetic braking force in accordance with the generated regenerative current acts on the stabilizer 10.

If the spring reaction force of the suspension exceeds the required control amount when the load is decreasing during the return control of the stabilizer 10, the active stabilizer 2 continuously controls the electromagnetic braking force that acts on the stabilizer 10, by controlling the regenerative current of the electric motor of the actuator 12. Therefore, the active stabilizer 2 is able to control of the change of the stabilizer 10 very precisely using the motor regeneration control through the use of the spring reaction force, and achieves high response in accordance with the vehicle behavior. Furthermore, in the active stabilizer 2, during the regeneration of the electric motor, there is no vibration caused by the driving of the electric motor, and electric power can be stored.

While the embodiments of the invention have described above, the invention is not limited to the foregoing embodiments, but can be carried out in various forms.

For example, although in the embodiments, the lateral acceleration (corresponding to the state of roll) is estimated on the basis of the steering angle and the vehicle speed, the lateral acceleration may be detected by a lateral acceleration sensor or the like. Besides, although in the embodiments, the road surface disturbance is estimated from changes in the stabilizer angle, the road surface disturbance may be detected by a suspension stroke sensor, a vehicle vertical acceleration sensor, a road surface irregularity detection sensor, etc.

Figure 7:
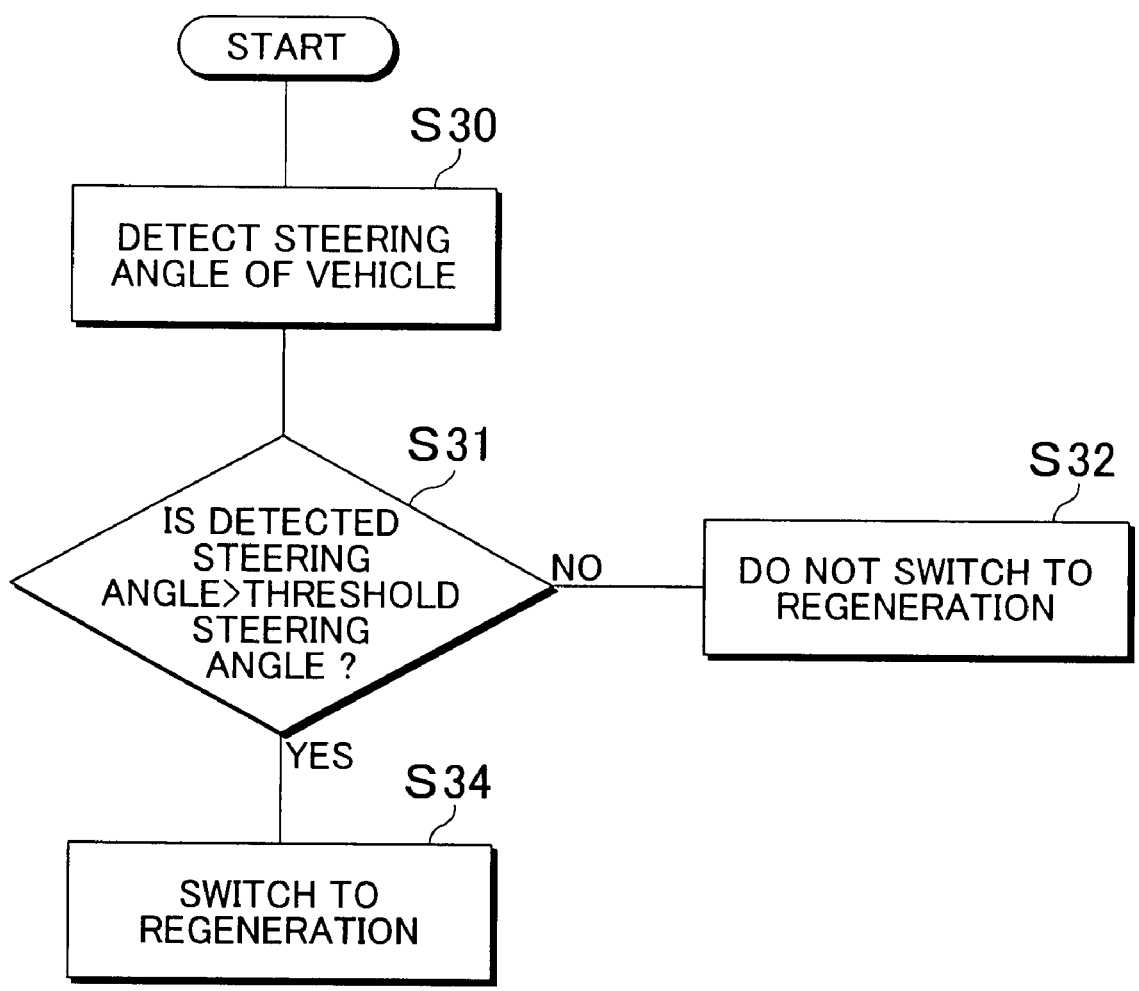
FIG. 7 is a flowchart showing a flow of control executed in an active stabilizer in accordance with the third embodiment.

The control of the electric motor may also be executed when the vehicle turning amount exceeds a predetermined value. The vehicle turning amount may be determined based on the lateral acceleration, steering speed, or steering angle etc. FIG. 7 is a flowchart showing the flow of a control executed by an active stabilizer that executes the control of the motor based on, for example, the steering angle. Accordingly, the ECU 32 may execute a control to switch the electric motor 12 from the driving control to the regenerative control when the steering angle of the vehicle detected by the steering angle sensor 21 exceeds a predetermined threshold steering angle. Specifically, the process begins with the detection of the steering angle by the steering angle sensor 21 (S30). The ECU then determines whether the detected steering angle exceeds a predetermined threshold steering angle (S31). If the ECU 32 determines that the detected steering angle exceeds the predetermined threshold steering angle, the electric motor 12 switches from drive to regeneration (S33). On the other hand, if the ECU 32 determines that the detected steering angle is equal to or below the predetermined threshold steering, the electric motor 12 does not change to regeneration (S32).

The control is executed because there limitations on the response performance of the electric motor 12 when the motor is driven. Thus, when it is necessary to rapidly change the axial force in the twisting direction (returning direction) of the stabilizer 10, such as when the steering angle is large, the driving control of the electric motor 12 may not be able to follow the rapid changes in the axial force. This will vary, however, with the performance characteristics of the electric motor 12.

In contrast, the regenerative control of the electric motor 12, which generally has better response performance, is better able to cope with the rapid changes in the axial force of the stabilizer 10. Thus, by having the electric motor 12 switch to the regenerative mode response performance is greatly improved and better able to cope with rapid changes of the stabilizer 10.

Figure 8:
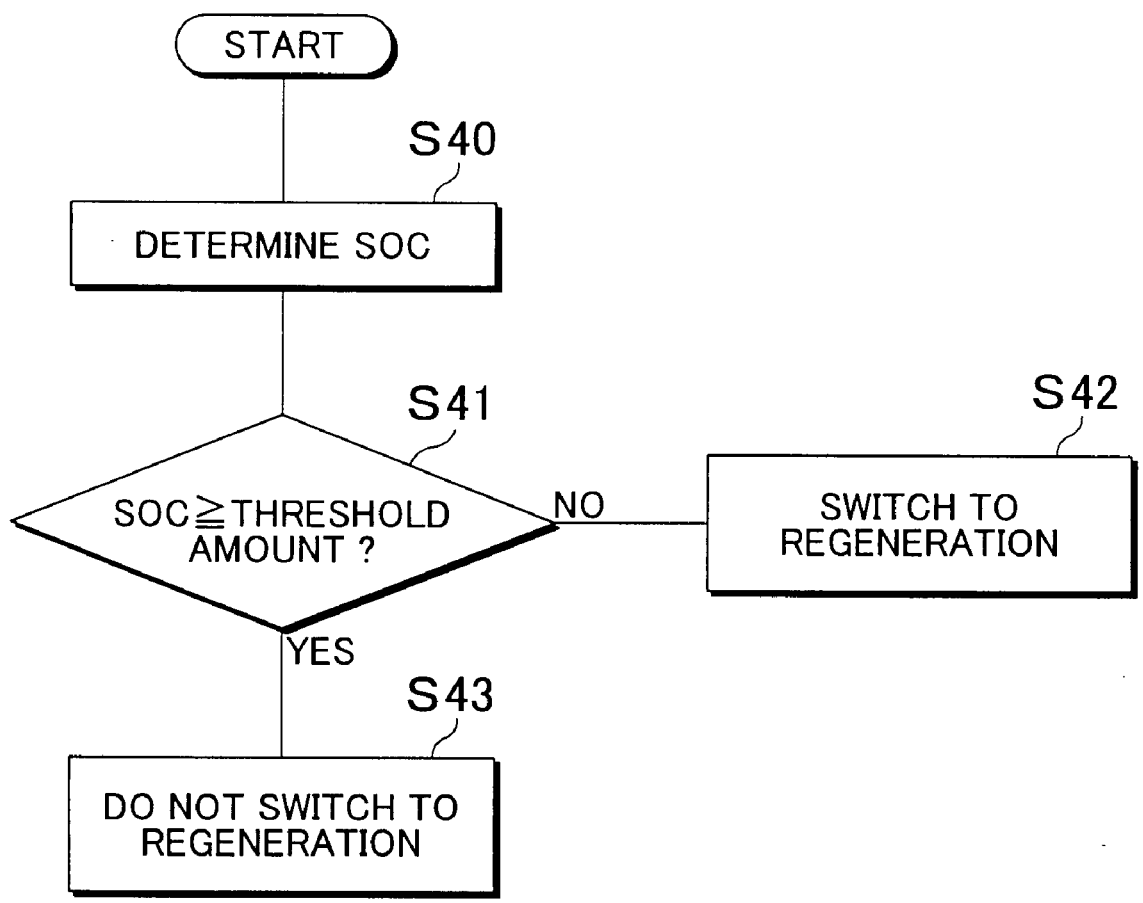
FIG. 8 is a flowchart showing a flow of control executed in an active stabilizer in accordance with the fourth embodiment.

Furthermore, execution of the control may also be based on the amount of electricity stored in the battery 40. FIG. 8 is a flowchart showing the flow of a control of the electric motor 12 executed by the ECU 32 based on the amount of electricity stored in the battery 40. The amount of electricity stored in the battery, or state of charge (SOC), is determined by the ECU 32 (S40). The ECU 32 then determines whether the actual SOC of the battery 40 is greater than or equal to a prescribed SOC (S41). If the actual SOC is below the threshold SOC, the electric motor 12 switches from drive to regeneration (S42). However, if the actual SOC is equal to or above the threshold SOC, the electric motor 12 does not change to regeneration (S43).

Thus, if the SOC of the battery 40 drops below a predetermined amount, the control of the electric motor 12 changes from the driving control to the regenerative control to increase the amount of electricity stored. Once the SOC of the battery 40 is greater than or equal to the predetermined amount, the regenerative control of the electric motor 12 may be disabled. In other words, the control is switched back to the driving control of the electric motor 12. Thus, the stabilizer 10 may be controlled by the driving of the electric motor 12, which allows active control of the stabilizer 10.

The threshold SOC of the battery 40 is generally the minimum amount of electricity that is needed to operate the vehicle and/or accessories. Thus, the predetermined stored electricity amount may be set to a predetermined level or it may be determined dynamically, taking into account the current electric power needs in the vehicle.

Although in the first embodiment, the stabilizer is controlled only through the regeneration of the electric motor 12, the electric motor 12 may also be driven to control the stabilizer 10.

What is claimed is:

1. A stabilizer control device for a vehicle comprising:
an electric motor that has a regenerative function;
a stabilizer that connects a left wheel and a right wheel and that adjusts a roll rigidity of the vehicle via the electric motor, wherein the regenerative function of the electric motor uses a spring reaction force of the stabilizer to generate an electromagnetic braking force;
vehicle behavior detection device that detects a vehicle behavior;
regenerative current setting device that sets a target regenerative current of the electric motor based on the vehicle behavior detected by the vehicle behavior detection device; and
regenerative current adjusting device that adjusts the regenerative current of the electric motor so that the target regenerative current set by the regenerative current setting device is reached,
wherein the roll rigidity is adjusted by controlling the drive and regenerative functions of the electric motor, and
the stabilizer control device controls changes in at least one of a twisting direction and a returning direction of the stabilizer through the use of the electromagnetic braking force.

2. The stabilizer control device according to claim 1, wherein
the vehicle behavior detection device detects an amount of roll of a vehicle, and
the regenerative current setting device sets a higher regenerative current when the detected amount of roll is large than when the detected amount of roll is small.

3. The stabilizer control device according to claim 1, wherein
the vehicle behavior detection device detects a magnitude of a disturbance-caused vehicle behavior change due to a road surface, and
the regenerative current setting device sets a lower regenerative current when the detected magnitude of the disturbance-caused vehicle behavior change is large than when the detected magnitude of the disturbance-caused vehicle behavior change is small.

4. The stabilizer control device according to claim 1, wherein
if a spring reaction force of a suspension is greater than a required control amount of the electric motor when the stabilizer is in a returning direction, the regenerative current setting device sets the regenerative current to a target control amount that is equal to a difference between the reaction force of a spring of the suspension and the required control amount.

5. The stabilizer control device according to claim 1, further comprising:
turning amount detection device that detects a turning amount of the vehicle, wherein if the detected turning amount exceeds a prescribed turning amount, the electric motor switches from drive to regeneration.

6. The stabilizer control device according to claim 1, further comprising:
a battery, wherein if an amount of electricity stored in the battery drops below a prescribed stored electricity amount, the electric motor switches from drive to regeneration.

7. The stabilizer control device according to claim 1, further comprising:
a battery, wherein if an amount of electricity stored in the battery is greater than or equal to a prescribed stored electricity amount, the electric motor does not switch from drive to regeneration.

8. A method of controlling a stabilizer comprising:
detecting a vehicle behavior;
setting a target regenerative current of an electric motor having a regenerative function based on the detected vehicle behavior;
generating an electromagnetic braking force using a spring reaction force of a stabilizer that connects a left wheel and a right wheel of the vehicle; and
adjusting the regenerative current of the electric motor so that the electromagnetic braking force can be changed,
wherein adjustment of the electromagnetic braking force controls changes in at least one of a twisting direction and a returning direction of the stabilizer.

9. The method according to claim 8, wherein the vehicle behavior detected is an amount of roll of a vehicle, and a higher regenerative current is set when the detected amount of roll is large than when the detected amount of roll is small.

10. The method according to claim 8, wherein the vehicle behavior detected is a magnitude of a disturbance-caused vehicle behavior change due to a road surface, and a smaller regenerative current is set when the detected magnitude of the disturbance-caused vehicle behavior change is large than when the detected magnitude of the disturbance-caused vehicle behavior change is small.

11. The method according to claim 8, wherein if a spring reaction force of a suspension is greater than a required control amount of the electric motor when the stabilizer is in a returning direction, the regenerative current is set to a target control amount that is equal to a difference between the reaction force of a spring of the suspension and the required control amount.

12. The method according to claim 8, further comprising:
detecting a turning amount of the vehicle, wherein if the detected turning amount exceeds a prescribed turning amount, the electric motor switches to a regeneration mode.

13. The method according to claim 8, further comprising:
determining an amount of electricity stored in a battery, wherein if the detected stored electricity amount is below a prescribed stored electricity amount, the electric motor switches from drive to regeneration.

14. The method according to claim 8, further comprising:
determining an amount of electricity stored in a battery, wherein if a stored electricity amount is greater than or equal to a prescribed stored electricity amount, the electric motor does not switch from drive to regeneration.

* * * * *